Patented Dec. 10, 1929

1,738,745

UNITED STATES PATENT OFFICE

ARCHIE J. WEITH, OF CALDWELL, AND VIRGIL E. MEHARG, OF BLOOMFIELD, NEW JERSEY, AND HARRY W. AHLBECK, OF RIVERSIDE, ILLINOIS, ASSIGNORS TO BAKE-LITE CORPORATION, OF NEW YORK, N. Y., A CORPORATION OF DELAWARE

PROCESS OF MAKING FORMALDEHYDE

No Drawing.  Application filed October 29, 1927.  Serial No. 229,789.

This invention relates to the manufacture of formaldehyde by catalytic oxidation of methanol.

It is known that in processes of this type, as at present practiced, the recovery of formaldehyde is materially less than the equivalent of the methanol oxidized, indicating the formation of certain by-products of reaction, the nature of which is imperfectly understood. Our investigations have shown that these by-products include, in addition to formic acid, such compounds as methylal, dimethoxy dimethyl ether, dimethyl acetal, and possibly others. These by-products are valueless, or of lower value than formaldehyde, and their formation accordingly represents an economic loss.

We have discovered that the formation of these by-products is contingent upon, or at least greatly accelerated by, the presence of acid-reacting substances, including formic acid, which is itself a common by-product of the reaction, it clearly appearing from our investigations that acid conditions tend strongly to induce further reactions between methanol and formaldehyde, or of formaldehyde upon itself, to form these by-products.

Such reactions may occur at several stages of the process, and especially during the catalytic oxidation; during the subsequent condensation or absorption of the formaldehyde hereinafter referred to as the recovery step; and during the distillation of the product.

We have further discovered that such objectionable reactions may be prevented or retarded by the presence, in the mixture, of an alkaline reagent in quantity sufficient to combine with and neutralize any acid present therein or produced during the operation. For this purpose we prefer to use either such bases as do not under the conditions present react with formaldehyde, as for example basic compounds of the alkali or alkaline earth metals; or we may use such compounds as ammonia, which reacts with formaldehyde to yield hexamethylenetetramine, itself a basic body and hence capable of neutralizing the acids.

In the preferred embodiment of our invention, we introduce the alkaline agent in such amounts and at such points in the system as will prevent the development of an acid condition at any operating stage. For example:

1. Ammonia, preferably anhydrous, is fed into the methanol-air line leading to the catalyzers at such rate that the liquid condensate from the vapors leaving the catalyzers is substantially neutral. The ammonia, or the hexamethylenetetramine resulting from its reaction with formaldehyde, neutralizes any acid produced in the catalyzers, and thereby prevents the detrimental effect of this acid in producing undesired by-products in the condensing and scrubbing systems. The ammonia likewise prevents corrosion of the condenser tubes and other portions of the equipment.

2. Ammonia or equivalent alkaline reacting compound is added to the methanol-formaldehyde-water solution previous to distillation, in amount sufficient to neutralize any formic or other acid which may be present, thereby minimizing the formation of methlyal and other by-products during distillation. It is desirable to carry this neutralization to the turning point of phenolphthaline, or other suitable indicator, in order to insure neutralization of any formic or other acid produced during the distillation.

Our invention contemplates broadly the introduction of the ammonia or other acid neutralizing substance at any operating stage prior to the final distillation, or if desired at a plurality of such stages.

We claim:

1. In a process of making formaldehyde by catalytic oxidation of methanol, maintaining substantial neutrality of the reaction mixture throughout the steps of catalysis, recovery and distillation, whereby the formation of by-products is minimized.

2. In a process of making formaldehyde by catalytic oxidation of methanol, the step of introducing ammonia into the methanol-air mixture entering the catalyzers, in proportion sufficient to insure substantial neutrality of the condensate therefrom.

3. In a process of making formaldehyde by catalytic oxidation of methanol, the step of adding a basic substance to the reaction mixture prior to distillation, in proportion to insure a substantially neutral condensate from said distillation.

4. In a process of making formaldehyde by catalytic oxidation of methanol, the step of adding ammonia to the reaction mixture prior to distillation, in proportion to insure a substantially neutral condensate from said distillation.

In testimony whereof, we affix our signatures.

ARCHIE J. WEITH.
VIRGIL E. MEHARG.
HARRY W. AHLBECK.